(12) United States Patent
Zielinski et al.

(10) Patent No.: US 7,883,053 B2
(45) Date of Patent: Feb. 8, 2011

(54) HEAT EXCHANGER SYSTEMS AND ASSOCIATED SYSTEMS AND METHODS FOR COOLING AIRCRAFT STARTER/GENERATORS

(75) Inventors: Edward Zielinski, Kent, WA (US); Thomas M. Murray, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 12/244,595

(22) Filed: Oct. 2, 2008

(65) Prior Publication Data

US 2009/0025913 A1   Jan. 29, 2009

Related U.S. Application Data

(62) Division of application No. 11/060,184, filed on Feb. 16, 2005, now Pat. No. 7,434,765.

(51) Int. Cl.
 *B64D 33/10* (2006.01)
(52) U.S. Cl. .................. 244/57; 165/164; 165/140; 60/730; 244/53 A
(58) Field of Classification Search .................. 165/164, 165/165, 172, 173, 174, 903; 60/266, 730, 60/912; 244/57, 53 A
See application file for complete search history.

(56) References Cited

U.S. PATENT DOCUMENTS

| 3,300,965 | A | 1/1967 | William et al. |
| 3,537,513 | A | 11/1970 | Bridgnwell et al. |
| 3,587,731 | A | 6/1971 | Hays |
| 3,752,222 | A | 8/1973 | Olbermann, Jr. |
| 3,756,020 | A | 9/1973 | Moskowitz et al. |
| 3,774,678 | A | 11/1973 | Glorisi |
| 4,041,697 | A | 8/1977 | Coffinberry et al. |
| 4,126,178 | A | 11/1978 | Kelm |
| 4,151,710 | A | 5/1979 | Griffin et al. |
| 4,327,802 | A | 5/1982 | Beldam et al. |
| 4,567,812 | A | 2/1986 | Weiler et al. |
| 4,620,588 | A | 11/1986 | Pfouts et al. |
| 4,711,298 | A | 12/1987 | Rogier et al. |
| 5,172,752 | A | 12/1992 | Goetz, Jr. |
| 5,303,771 | A | 4/1994 | Des Champs |
| 5,964,280 | A | 10/1999 | Wehrmann et al. |
| 6,089,313 | A | 7/2000 | Levy et al. |
| 6,134,878 | A | 10/2000 | Amako et al. |
| 6,182,435 | B1 | 2/2001 | Niggemann et al. |

(Continued)

*Primary Examiner*—Benjamin P Lee
(74) *Attorney, Agent, or Firm*—Perkins Coie LLP (57) ABSTRACT

Heat exchanger systems and associated systems and methods for cooling aircraft starters/generators are disclosed. A system in accordance with one embodiment includes a first fluid flow path for a first fluid, a second fluid flow path for a second fluid, and a third fluid flow path for a third fluid. The first and second flow paths are positioned proximate to the third flow path to transfer heat between the third fluid and both the first and second fluids. The third flow path is configured to allow a transfer of heat between the second and third fluids at a first transfer rate when the first fluid carries heat at a first rate, and at a second transfer rate different than the first transfer rate when the first fluid does not carry heat, or carries heat at a second rate less than the first rate. Accordingly, when the heat to be rejected by one fluid is decreased, the heat transfer rate for the remaining fluid can be increased.

18 Claims, 6 Drawing Sheets

U.S. PATENT DOCUMENTS

| | | |
|---|---|---|
| 6,282,881 B1 | 9/2001 | Beutin et al. |
| 6,345,508 B1 | 2/2002 | Bodhaine et al. |
| 6,651,441 B2 | 11/2003 | Reuter et al. |
| 6,672,075 B1 | 1/2004 | Sandu et al. |
| 6,789,613 B1 | 9/2004 | Ozaki et al. |
| 6,817,406 B1 | 11/2004 | Inoue et al. |
| 6,931,834 B2 | 8/2005 | Jones et al. |
| 7,059,397 B2 | 6/2006 | Chatel et al. |
| 7,111,669 B2 | 9/2006 | Hoglinger et al. |
| 7,188,492 B2 | 3/2007 | Corduan et al. |
| 7,191,824 B2 | 3/2007 | Wu et al. |
| 7,213,391 B2 | 5/2007 | Jones et al. |
| 7,434,765 B2 | 10/2008 | Zielinski et al. |
| 2004/0159424 A1 | 8/2004 | Reinke et al. |
| 2005/0109493 A1 | 5/2005 | Wu et al. |
| 2005/0252635 A1 | 11/2005 | Adamson et al. |
| 2006/0076125 A1 | 4/2006 | Fang et al. |
| 2006/0113068 A1 | 6/2006 | Desai et al. |

HEAT EXCHANGER SYSTEMS AND ASSOCIATED SYSTEMS AND METHODS FOR COOLING AIRCRAFT STARTER/GENERATORS

CROSS-REFERENCE TO RELATED APPLICATION

This application is a divisional of U.S. application Ser. No. 11/060,184, filed Feb. 16, 2004, which issued on Oct. 14, 2008 as U.S. Pat. No. 7,434,765.

TECHNICAL FIELD

The present invention is directed generally toward heat exchanger systems and associated systems and methods for cooling aircraft starter/generators.

BACKGROUND

Existing commercial jet transport aircraft include multiple turbofan engines, each coupled to a starter/generator. The starter/generator is used both to start the turbofan engine and extract electrical power from the turbofan engine once the turbofan engine is started. The extracted electrical power is then routed to electrical systems on the aircraft.

Figure 1:
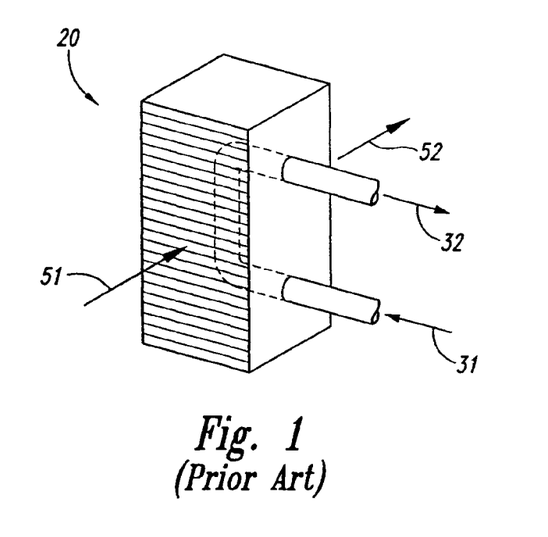
FIG. 1 is a schematic illustration of a heat exchanger in accordance with the prior art.

Existing starter/generators create heat that must be dissipated to prevent overheating and subsequent system failure. FIG. 1 illustrates a typical air-cooled oil cooler 20 (i.e., a heat exchanger) designed for this purpose. The heat exchanger 20 receives hot cooling oil from the starter/generator via a hot oil supply 31, and returns cooled oil to the starter/generator via a cool oil return 32. Within the heat exchanger 20, cold air cools the initially hot oil. The cold air can be received from a cold air supply 51, which is coupled to an air source, for example, an air scoop located behind the fan of the turbofan engine. A warm air return 52 returns air warmed by the oil, for example, by reintroducing the air to the fan flow, or by dumping the air overboard the aircraft.

The foregoing arrangement has proved suitable for aircraft having a single starter/generator associated with each turbofan engine. However, newer aircraft are placing greater electrical demands on the turbofan engines and accordingly include multiple starter/generators associated with each turbofan engine. One approach for cooling the additional starter/generators is to provide a heat exchanger generally similar to the one shown in FIG. 1 for each starter/generator. However, this can dramatically increase the weight of the heat exchanger system and is therefore not satisfactory. As a result, there is a need for a lighter weight, more efficient heat exchanger system.

SUMMARY

The present invention is directed generally toward heat exchanger systems and associated systems and methods for cooling aircraft starter/generators. A heat exchanger system in accordance with one aspect of the invention includes a first flow path for a first fluid, a second flow path for a second fluid, and a third flow path for a third fluid. The first and second flow paths are positioned proximate to the third flow path to transfer heat between the third fluid and both the first and second fluids. The third flow path is configured to allow a transfer of heat between the second and third fluids at a first transfer rate when the first fluid carries heat at a first rate, and at a second transfer rate different than the first transfer rate when the first fluid does not carry heat, or carries heat at a second rate less than the first rate.

In other aspects of the invention, the heat exchanger system can be coupled to an aircraft propulsion system having a first starter/generator and a second starter/generator. The first flow path can be coupled to the first starter/generator to carry a first cooling fluid (e.g., oil), and the second flow path can be coupled to the second starter/generator to carry a second cooling fluid (e.g., additional oil). The third flow path can be coupled to a cooling air intake.

In any of the foregoing arrangements, the flow paths can be integrated in such a manner that if the cooling requirements for one of the first and second flow paths drops, the amount of heat exchanged along the other flow path can increase. For example, the first and second flow paths can "cross" each other between their respective entrances and exits.

In a particular aspect, the first flow path can include a first entrance and a first exit, the second flow path can include a second entrance and a second exit, and the third flow path can include a third entrance and a third exit. The first entrance can be located between the third entrance and the second entrance, and the second exit can be located between the third entrance and the first exit. The first flow path can pass between the third entrance and the second flow path, and the second flow path can pass between the third entrance and the first flow path.

A method for transferring heat in accordance with another aspect of the invention includes directing a first fluid along a first flow path, directing a second fluid along a second flow path, and directing a third fluid along a third flow path, proximate to both the first and second flow paths. The method can further include transferring heat between the third fluid and the second fluid at a first transfer rate when the first fluid carries heat at a first rate. The method can still further include transferring heat between the third fluid and the second fluid at a second transfer rate different than the first transfer rate when the first fluid does not carry heat, or carries heat at a second rate less than the first rate. In a further particular aspect, the shift in transfer rates can be accomplished without changing the geometric arrangements of the first, second or third flow paths.

DETAILED DESCRIPTION

The present disclosure describes heat exchanger systems and associated systems and methods for cooling aircraft starter/generators. In at least some embodiments, first and second fluid flows are cooled by a third fluid flow. The first and second fluid flow paths can be compactly arranged so that each flow path has an increased exposure to the cooling capability of the third flow when cooling requirements of the other flow path decrease. Certain specific details are set forth in the following description and in FIGS. 2-5E to provide a thorough understanding of various embodiments of the invention. Well-known structures, systems, and methods often associated with these systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 2:
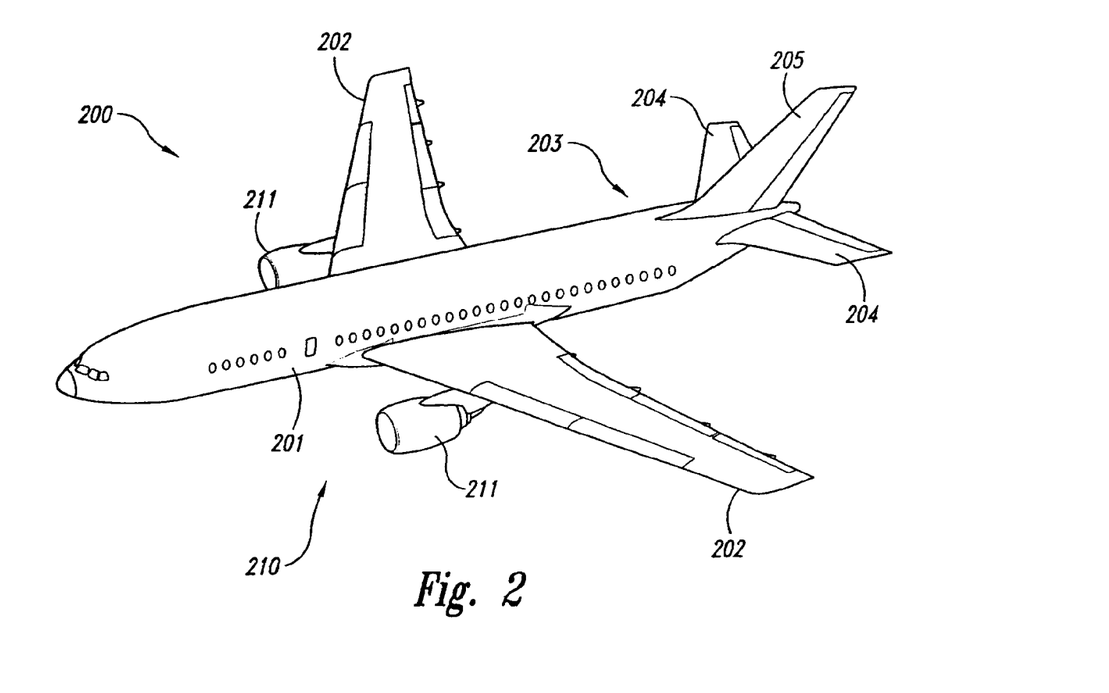
FIG. 2 is an isometric illustration of an aircraft that can house a heat exchanger system in accordance with an embodiment of the invention.

FIG. 2 illustrates an aircraft 200 having a propulsion system 210 coupled to starter/generators that are in turn cooled in accordance with an embodiment of the invention. The propulsion system 210 can include two turbofan engines 211. In a particular embodiment shown in FIG. 2, the engines 211 are carried by the wings 202 of the aircraft 200. In other embodiments, the engines 211 can be carried by the fuselage 201 and/or the empennage 203. The empennage 203 can also support horizontal stabilizers 204 and a vertical stabilizer 205.

Figure 3:
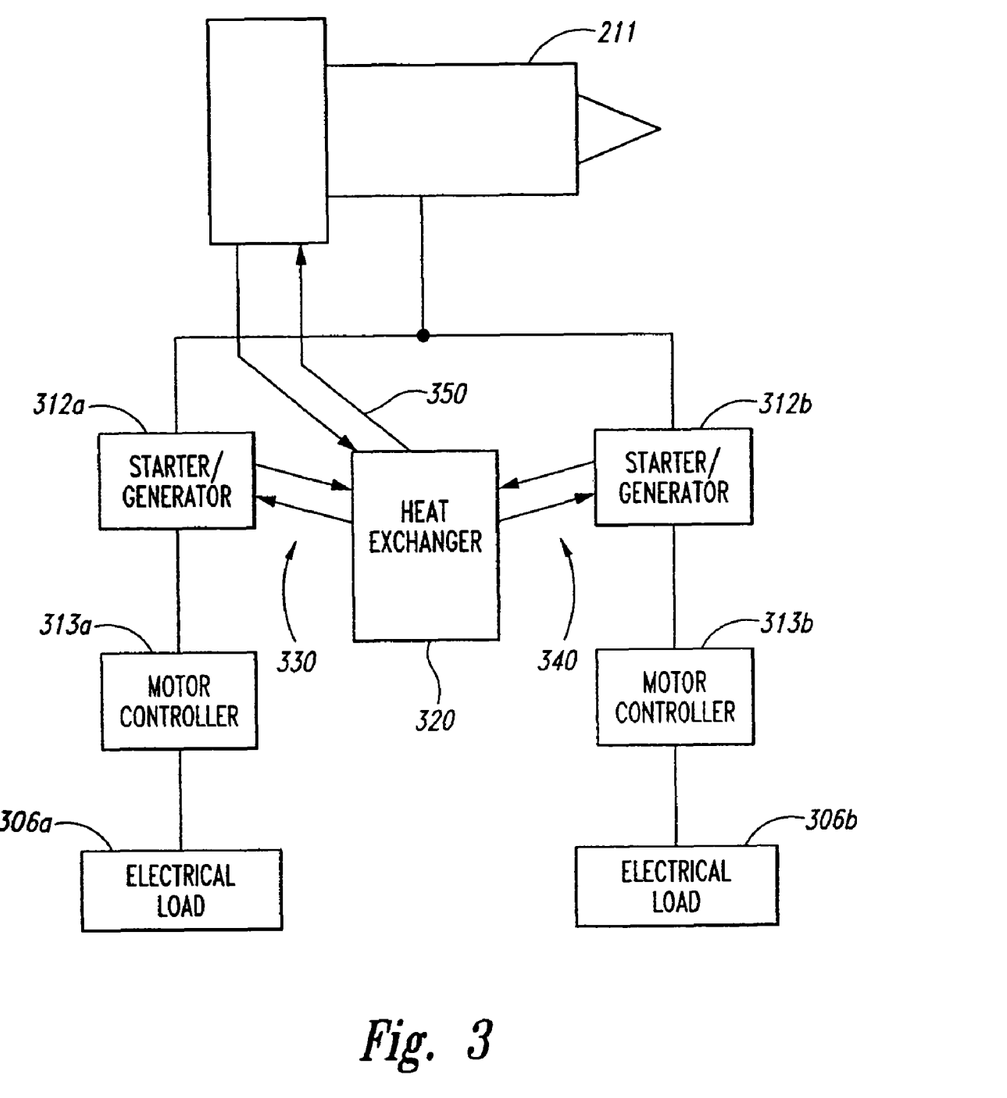
FIG. 3 is a schematic illustration of an aircraft engine coupled to two starter/generators, and an associated heat exchanger configured in accordance with an embodiment of the invention.

FIG. 3 is a schematic illustration of one of the engines 211 described above with reference to FIG. 2. The engine 211 can be coupled to two starter/generators 312 (shown as a first starter/generator 312a and a second starter/generator 312b). Each starter/generator 312 can be coupled to a separate motor controller 313 (shown as a first motor controller 313a and a second motor controller 313b). Each motor controller 313 can be coupled to a corresponding electrical load 306 (shown as a first electrical load 306a and a second electrical load 306b). Each electrical load 306 can include electric actuators, flight deck computers and displays, fans, motors, and/or other electrically powered aircraft equipment.

Both the first starter/generator 312a and the second starter/generator 312b can be coupled to a common heat exchanger 320 for cooling. Accordingly, a first supply/return path 330 can conduct a cooling fluid (e.g., an oil) between the first starter/generator 312a and the heat exchanger 320. A second supply/return path 340 can conduct a second fluid (e.g., an independent supply of oil) between the second starter/generator 312b and the heat exchanger 320. A third supply/return path 350 can direct a third fluid to the heat exchanger 320 to cool the first and second fluids. In one aspect of this embodiment, the third fluid can include air removed from the fan flow of the engine 211, and returned to the fan flow after passing through the heat exchanger 320. In other embodiments, the third fluid can be extracted from and/or returned to other portions of the aircraft, and/or can include fluids other than air (e.g., aviation fuel).

Figure 4A:
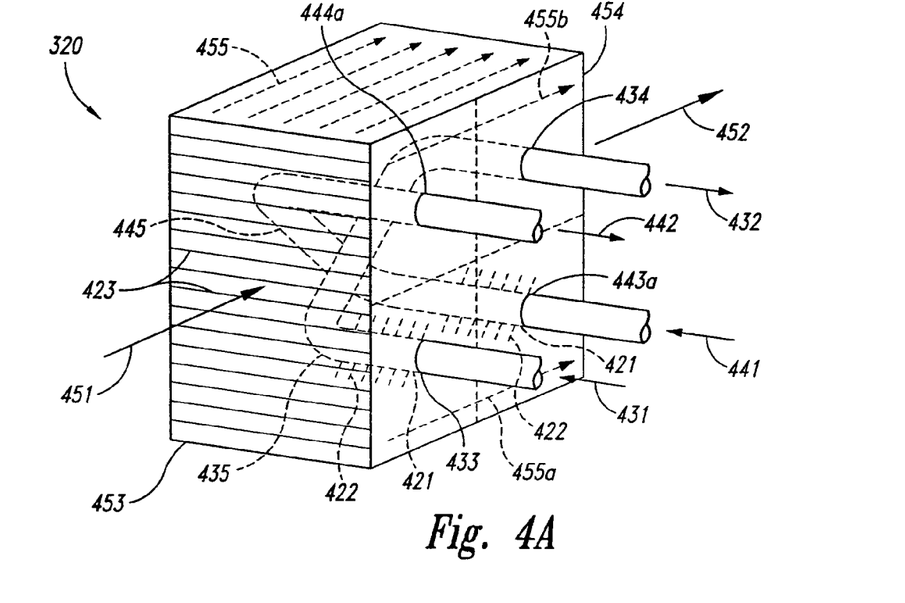
FIGS. 4A-4B illustrate heat exchangers configured to cool two fluid flows in accordance with further embodiments of the invention.

FIG. 4A is a schematic, isometric illustration of the heat exchanger 320 shown in FIG. 3. The heat exchanger 320 can be coupled to a first fluid supply 431 at a first fluid entrance 433, and to a first fluid return 432 at a first fluid exit 434. A first flow path 435 directs the first fluid from the first fluid entrance 433 to the first fluid exit 434. The first flow path 435 can include a conduit 421 having multiple cooling fins 422 (only a few of which are shown in FIG. 4A) to cool the first fluid by exposure to the third fluid.

The heat exchanger 320 can receive the second fluid via a second fluid supply 441 at a second fluid entrance 443a, and can return the second fluid via a second fluid return 442 at a second fluid exit 444a. A second flow path 445 directs the second fluid from the second fluid entrance 443a to the second fluid exit 444a. Like the first flow path 435, the second flow path 445 can include a conduit 421 having multiple external cooling fins 422.

The first and second fluids are cooled by the third fluid in a cross-flow heat exchanger arrangement. The third fluid is received via a third fluid supply 451 at a third fluid entrance 453. The third fluid can be discharged from the heat exchanger 320 to a third fluid return 452 at a third fluid exit 454. A third flow path 455 directs the third fluid proximate to the first flow path 435 and the second flow path 445 to cool the first and second fluids, respectively. The third flow path 455 can include vanes 423 or other structures positioned to direct the third fluid in a manner that efficiently cools both the first and second fluids.

One feature of an embodiment of the heat exchanger 320 shown in FIG. 4A is that the first flow path 435 and the second flow path 445 cross over each other in a region where they are exposed to the third fluid. In a particular aspect of an embodiment shown in FIG. 4A, the first flow path 435 and the second flow path 445 cross over each other only once, but in other embodiments, the two flow paths can cross over each other more than once. An aspect of any of these embodiments is that the first flow path 435 passes close to the third fluid entrance 453 over at least part of its length, and the second flow path 445 passes close to the third fluid entrance 453 over at least part of its length. Put another way, the third flow path 455 can include a first segment 455a and a generally parallel second segment 455b. The first segment 455a passes (sequentially) adjacent to the first fluid entrance 433 and then the second fluid entrance 443a. The second segment 455b passes (sequentially) adjacent to the second fluid exit 444a and the first fluid exit 434.

One advantage of the foregoing arrangement is that the third fluid can provide roughly equal cooling benefits for both the first and second fluids. For example, each of the first and second flow paths 435, 445 can include a segment closer to the third fluid entrance 453 (which is relatively cool) than to the third fluid exit 454 (which is warmer), and another segment that is closer to the third fluid exit 454 than to the third fluid entrance 453. Accordingly, each of the first and second fluids can have roughly equal exposure to relatively cool portions of the third fluid, and warmer portions of the third fluid.

Another advantage is that, when the heat transfer requirements for one of the first and second fluids is reduced, the rate of heat transfer from the remaining fluid can be increased. For example, in one mode of operation (e.g., "normal" operation), the rate at which heat is transferred away from the first fluid is relatively high toward the first fluid entrance 443 and, because the second flow path 445 is positioned between the first fluid exit 434 and the third fluid entrance 453, the rate at which heat is transferred away from the first fluid is somewhat lower toward the first fluid exit 434. Conversely, the rate at which heat is transferred from the second fluid may be relatively low toward the second fluid entrance 443a because the first flow path 435 is positioned between the second fluid entrance 443a and the third fluid entrance 453. The rate at which heat is transferred away from the second fluid can be increased toward the second fluid exit 444a because the first flow path 435 is not interposed between the second flow path 445 and the third fluid entrance 453 in this region. If, in a second mode of operation, the rate at which heat is carried by the second fluid decreases (e.g., because the fluid flow rate decreases or because the temperature of the second fluid decreases), then the temperature of the third fluid after passing over the second flow path 445 proximate to the second fluid exit 444a will increase. As a result, the third fluid passing over the first flow path 435 proximate to the first fluid exit 434 will cool the first fluid at a greater rate. Therefore, the overall rate at which heat is transferred away from the first fluid will tend to increase as the rate at which heat carried by the second fluid decreases. In the limit, when the flow rate of the second fluid is reduced to zero, the entire capacity of the heat exchanger 320 can be directed to transferring, heat away from the first fluid alone.

The foregoing arrangement can be advantageous for several reasons. One is that the heat transfer requirements for both the first and second fluids can be met by a single device, which can reduce duplicative structures and can accordingly reduce the overall weight of the heat exchanger 320 when compared to two separate heat exchangers, each dedicated to cooling one of the first and second fluids. This advantage can be particularly useful in aircraft installations, where low weight has a high priority.

Another advantage of the foregoing arrangement is best understood with reference to FIG. 3. If, for any reason, the second starter/generator 312b has a reduced cooling requirement, and therefore discharges heat to the heat exchanger 320 at a lower rate, the rate at which heat is transferred away from the first starter/generator 312a can be increased. Conversely, if the heat transfer requirements of the first starter/generator 312a are reduced, the rate at which heat is transferred away from the second starter/generator 312b can be increased. This result is not attainable with two independent, stand-alone heat exchangers.

The heat transfer requirements for either the first or second starter/generator can drop as a result of one or more of several circumstances. For example, the first or second electrical loads 306a, 306b can be different. One of the motor controllers 313 can fail, or one of the starter generators 312 can fail. In at least some of these cases, if the heat transfer requirements for one of the starter/generators 312 falls (for example, due to an equipment failure), at least some of the electrical load coupled to that starter/generator 312 can be shifted to the remaining (operating) starter/generator 312. As a result, the remaining starter/generator 312 will have an increased heat transfer requirement. As discussed above, this increased heat transfer requirement can be met by the heat exchanger 320 because the heat exchanger 320 has an effectively increased cooling capacity as a result of the heat transfer requirements for the failed starter/generator being reduced. This in turn can allow the (operating) starter/generator 312 to operate in an overload mode for a greater period of time than it would with an existing heat exchanger arrangement.

Yet another feature of embodiments described above is that the shift in relative heat transfer rates for the first and second fluids can be accomplished without the need for moving parts (e.g., movable vanes, valves or other mechanical devices). In other words, the geometric arrangements and structural configurations of the first, second and third flow paths, respectively, can remain generally the same even as the heat transfer rates shift. An advantage of this feature is that the heat exchanger 320 can be relatively simple to manufacture, maintain and operate.

Figure 4B:
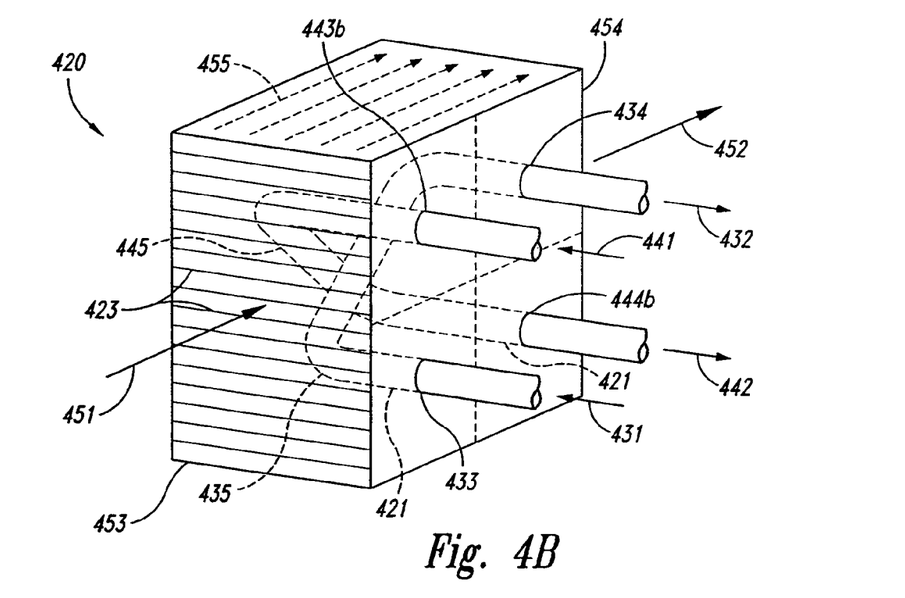

FIGS. 4B-5E illustrate heat exchangers having other arrangements that also include many of the features described above. For example, FIG. 4B illustrates a heat exchanger 420 having a geometry generally similar to that of the heat exchanger 320 described above with reference to FIG. 4A, but with the positions of the second fluid entrance and the second fluid exit reversed. Accordingly, the heat exchanger 420 can include a second fluid entrance 443b positioned close to the third fluid entrance 453, and a second fluid exit 444b positioned close to the third fluid exit 454. Whether a designer chooses a configuration generally similar to that of FIG. 4A or 4B (or any of FIGS. 5A-5E) depends on aspects that include the details of a particular installation.

FIGS. 5A-5E schematically illustrate side views of heat exchangers that include a fourth flow path for cooling a fourth fluid, in addition to flow paths for cooling the first and second fluids. In an aircraft installation, the fourth fluid can in turn be used to cool a component in addition to the starter/generators 312 (FIG. 3) without adding another heat exchanger. For example, referring first to FIG. 5A, a heat exchanger 520a can include a first flow path 535 that crosses a second flow path 545. The first flow path 535 is coupled between a first fluid entrance 533 and a first fluid exit 534, and the second flow path 545 is coupled between a second fluid entrance 543 and a second fluid exit 544. The heat exchanger 520a can also include a fourth flow path 565a extending between a fourth fluid entrance 563a and a fourth fluid exit 564a. The third fluid passes along a third flow path 555 between a third entrance 553 and a third fluid exit 554 to cool the first, second and fourth fluids. The fourth flow path 565a can be positioned upstream (with respect to the third flow path 555) of the first flow path 535 and the second flow path 545 and can accordingly provide "preferential" cooling for the fourth fluid. This arrangement may be suitable when the cooling requirements for the fourth fluid are expected to be greater than the cooling requirements for the first and second fluids.

Figure 5A:
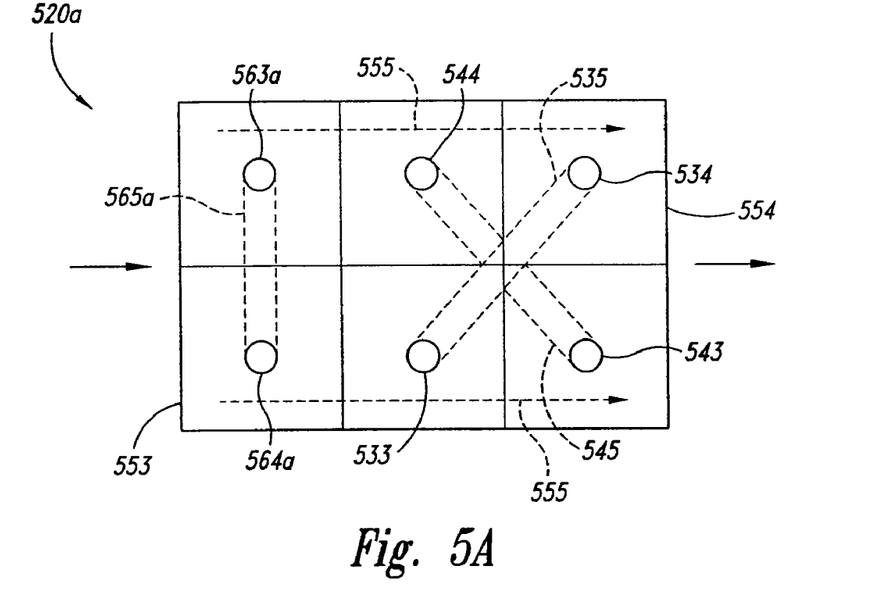
FIGS. 5A-5E illustrate heat exchangers configured to cool three fluid flows in accordance with still further embodiments of the invention.
Figure 5B:
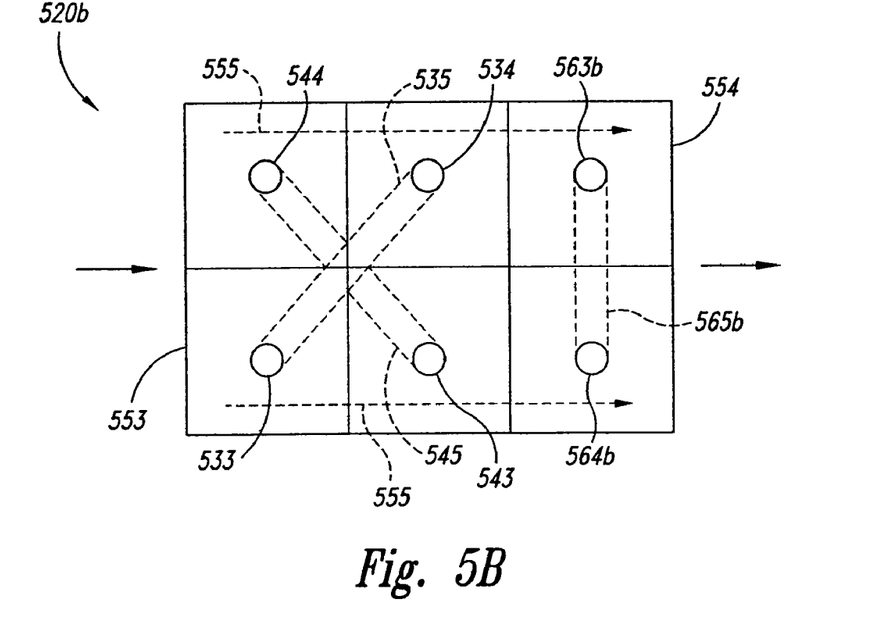

Referring now to FIG. 5B, a heat exchanger 520b can have a configuration generally similar to that described above with reference to FIG. 5A, but with the fourth flow path 565b located downstream of the first and second flow paths 535, 545. The fourth flow path 565b accordingly receives the fourth fluid via a fourth fluid entrance 563b and exits the fourth fluid via a fourth fluid exit 564b, both of which are located downstream of the first and second flow paths 535, 545 (relative to the flow direction of the third fluid). This arrangement may be suitable for situations in which the cooling requirements for the fourth fluid are expected to be less than the cooling requirements for the first and second fluids.

Figure 5C:
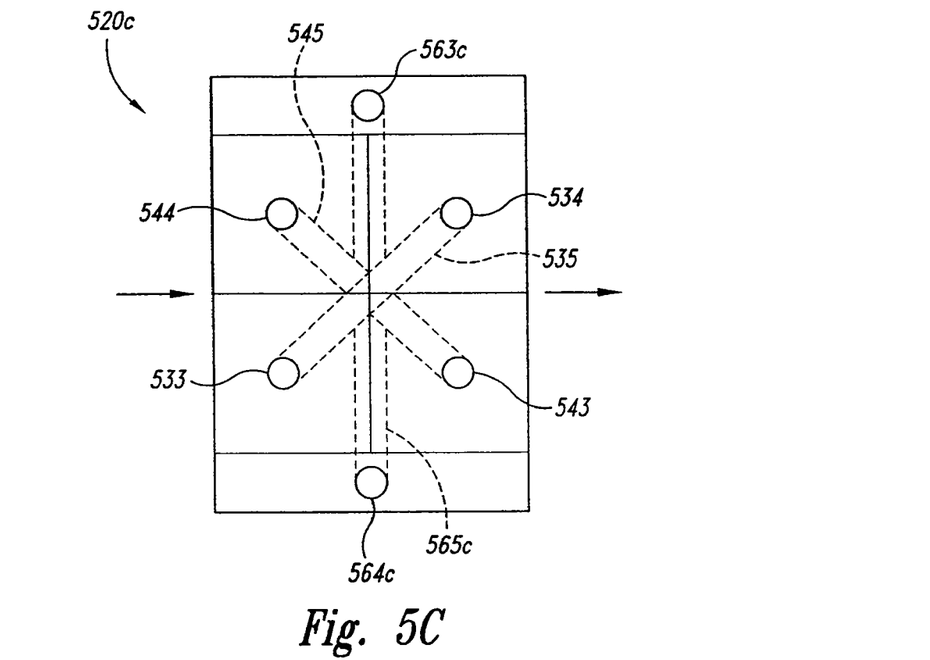
Figure 5D:
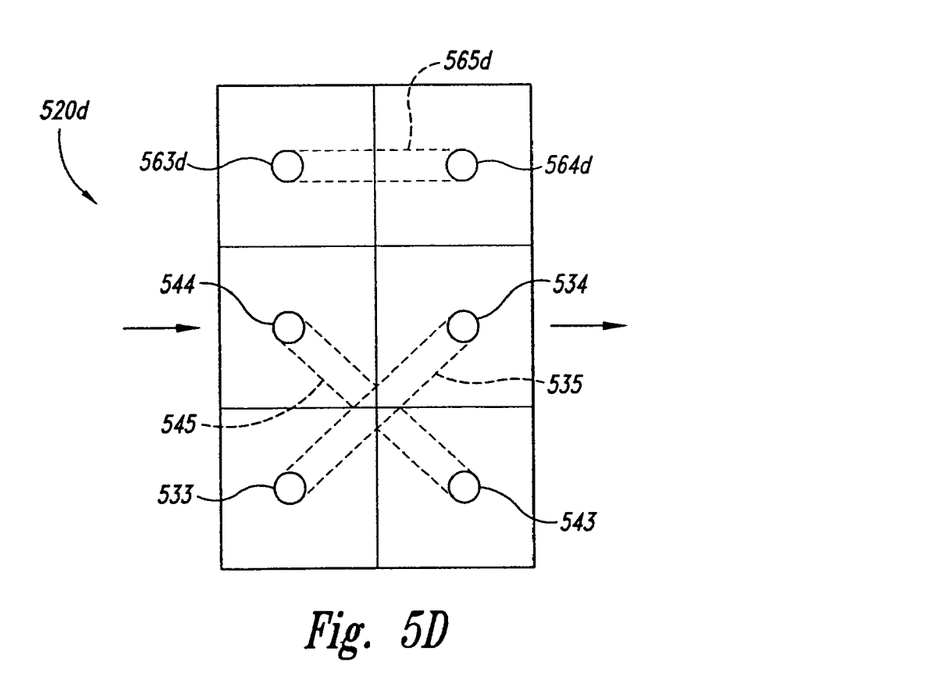

FIGS. 5C and 5D illustrate heat exchangers 520c and 520d, respectively, having fourth flow paths that are in parallel with the first and second flow paths. These arrangements may be suitable for situations in which the cooling requirements for the first, second and fourth fluids are roughly equal. For example, referring first to FIG. 5C, the heat exchanger 520c can include a fourth flow path 565c coupled between a fourth fluid entrance 563c and a fourth fluid exit 564c. The fourth flow path 565c is arranged in parallel with the first flow path 535 and the second flow path 545 so that changes in the heat transfer rate from the fourth fluid have a reduced or nonexistent effect on the heat transfer rate from the first and second fluids. In particular, the fourth flow path 565c can be offset into the plane of FIG. 5C, relative to the first flow path 535 and the second flow path 545.

FIG. 5D illustrates a heat exchanger 520d having a fourth flow path 565d (with a fluid entrance 563d and fluid exit 564d) that is also arranged in parallel with the first and second flow paths 535, 545. As described above with reference to FIG. 5C, the heat transfer rate from the fourth fluid can be generally independent of the heat transfer rate from the first and second fluids.

Figure 5E:
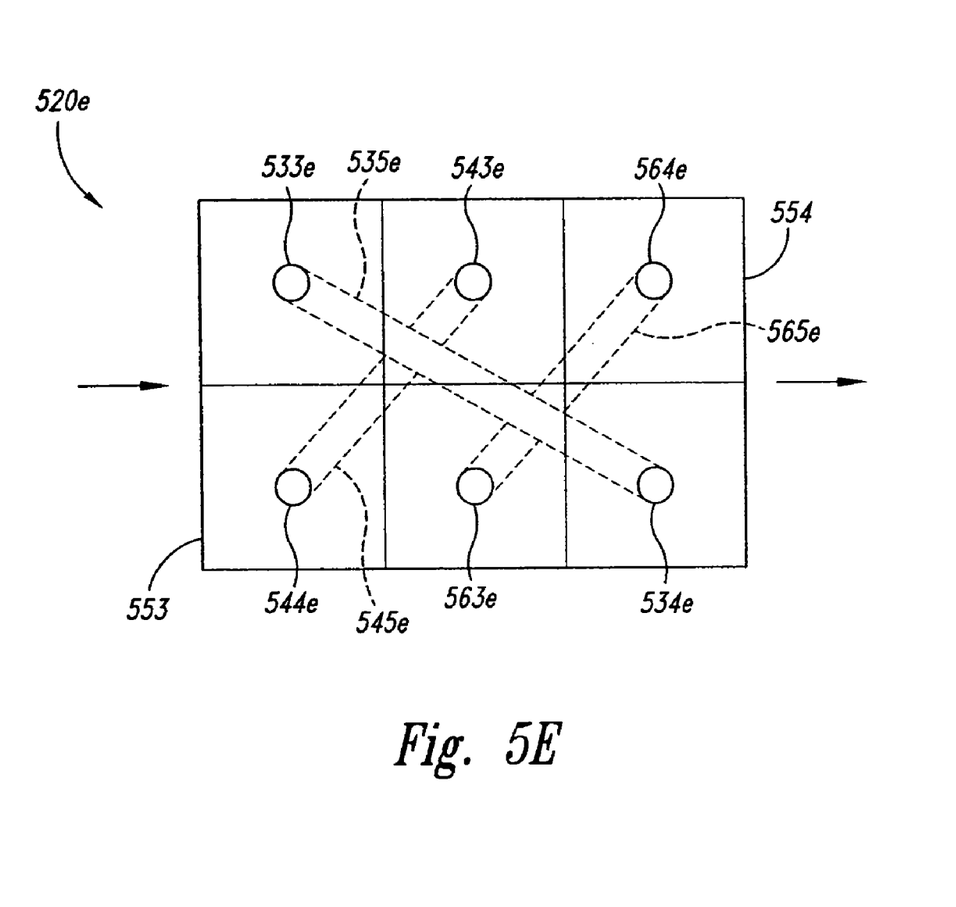

FIG. 5E illustrates a heat exchanger 520e for which flow paths for each of the first, second and fourth fluids cross each other. Accordingly, if the heat transfer requirements for any one of the flow paths is reduced, the other two flow paths can realize an increased heat transfer rate. In a particular aspect of the embodiment shown in FIG. 5E, a first fluid flow path 535e extends between a first fluid entrance 533e and a first fluid exit 534e and crosses both a second fluid flow path 545e and a fourth fluid flow path 565e. The second fluid flow path 545e extends between a second fluid entrance 544e and a second fluid exit 543e, and the fourth fluid flow path 565e extends between a fourth fluid entrance 563e and a fourth fluid exit 564e. The third fluid passes adjacent the first, second and fourth fluid flow paths between the third fluid entrance 553 and the third fluid exit 554. Because the first, second and fourth fluid flow paths cross each other, if the rate at which any of the flows carries heat energy falls, the effective heat transfer rate for both of the remaining two flow paths can be increased.

From the foregoing, it will be appreciated that specific embodiments of the invention have been described herein for purposes of illustration, but that various modifications may be made without deviating from the spirit and scope of the invention. For example, many of the heat exchangers described above have been described in the context of heat exchangers for aircraft engine starter/generators. In other embodiments, heat exchangers having generally similar characteristics can be integrated with other stationary or mobile devices. In many of the embodiments described above, heat is described as being transferred to a third fluid from a first, second (and optionally, fourth fluid or still further fluids). In other embodiments, the direction of heat transfer can have the opposite sense (e.g. to the third flow). In still a further example, many of the embodiments described above are configured to produce a greater overall heat transfer rate for one fluid when the rate at which heat energy carried by another fluid is reduced, without the need for moving parts. In other embodiments, the heat exchanger can include moving parts in addition to or in lieu of the flow path arrangements described above.

Aspects of the invention described in the context of particular embodiments may be combined or eliminated in other embodiments. For example, the conduits and fins described in the context of FIGS. 4A-4B can be included in the arrangements shown in FIGS. 5A-5E. Although advantages associated with certain embodiments of the invention have been described in the context of those embodiments, other embodiments may also exhibit other such advantages. Additionally, none of the foregoing embodiments need necessarily exhibit such advantages to fall within the scope of the invention. Accordingly, the invention is not limited except as by the appended claims.

We claim:

1. A method for transferring heat, comprising:
   directing a first fluid from a first aircraft engine starter/generator to a heat exchanger along a first flow path, wherein the first fluid includes a first cooling fluid;
   directing a second fluid from a second aircraft engine starter/generator to the heat exchanger along a second flow path, wherein the second fluid includes a second cooling fluid;
   directing a third fluid along a third flow path proximate to both the first and second flow paths, wherein the third fluid includes air, and wherein directing the third fluid includes directing the third fluid to the heat exchanger;
   transferring heat between the third fluid and the second fluid at a first transfer rate when the first fluid carries heat at a first rate; and
   transferring heat between the third fluid and the second fluid at a second transfer rate different than the first transfer rate when the first fluid does not carry heat or carries heat at a second rate less than the first rate.

2. The method of claim 1 wherein transferring heat at a second transfer rate includes transferring heat at a second transfer rate while the geometric arrangements of the first, second and third flow paths, respectively, are at least generally the same as when transferring heat at the first transfer rate.

3. The method of claim 1 wherein
   directing the third fluid to the heat exchanger, wherein the third fluid includes air directing the third fluid along the third flow path includes directing the third fluid from an entrance of the heat exchanger to an exit of the heat exchanger, with the first flow path passing between the entrance and the second flow path, and the second flow path passing between the entrance and the first flow path.

4. The method of claim 1 wherein:
   the first flow path includes a first entrance and a first exit;
   the second flow path includes a second entrance and a second exit;
   the third flow path includes a third entrance and a third exit;
   passing the first fluid includes passing the first fluid along a first flow path that extends away from the third fluid entrance; and
   passing the second fluid includes passing the second fluid along a second flow path that extends toward the third fluid entrance.

5. The method of claim 1 wherein:
   the first flow path includes a first entrance and a first exit;
   the second flow path includes a second entrance and a second exit;
   the third flow path includes a third entrance and a third exit, with the first fluid entrance located between the third fluid entrance and the second fluid exit;
   passing the first fluid includes passing the first fluid along a first flow path that extends away from the third fluid entrance; and
   passing the second fluid includes passing the second fluid along a second flow path that extends away from the third fluid entrance.

6. The method of claim 1 wherein:
   the first flow path includes a first entrance and a first exit;
   the second flow path includes a second entrance and a second exit;
   the third flow path includes a third entrance and a third exit; and
   passing the third fluid includes passing the third fluid along first and second generally parallel segments of the third flow path positioned between the third entrance and the third exit, with the third fluid in the first segment passing sequentially adjacent to the first flow path and the second flow path, and with fluid in the second segment passing sequentially adjacent the second flow path and the first flow path.

7. The method of claim 1 wherein the first, second and third flow paths are located in a single heat exchanger, and wherein the method further comprises directing a fourth fluid along a fourth flow path in the heat exchanger, and transferring heat between the third fluid and the fourth fluid.

8. The method of claim 1 wherein directing the first fluid includes directing oil.

9. The method of claim 1 wherein directing the first fluid includes directing oil from a first supply, and wherein directing the second fluid includes directing oil from a second supply independent of the first supply.

10. The method of claim 1 wherein transferring heat at the second transfer rate includes transferring heat at a second transfer rate higher than the first transfer rate.

11. The method of claim 1, further comprising:
    transferring heat between the first fluid and the third fluid at approximately the first transfer rate when the first fluid carries heat at the first rate; and
    when the first fluid does not carry heat or carries heat at the second rate, not transferring heat between the first fluid and the third fluid, or transferring heat between the first fluid and the third fluid at a fourth rate less than the first rate.

12. A method for transferring heat, comprising:
directing a first fluid along a first flow path, wherein directing the first fluid includes directing the first fluid from a first aircraft engine starter/generator to a heat exchanger, and wherein the first fluid includes a first cooling fluid;
directing a second fluid along a second flow path, wherein directing the second fluid includes directing the second fluid from a second aircraft engine starter/generator to the heat exchanger, and wherein the second fluid includes a second cooling fluid;
directing a third fluid along a third flow path proximate to both the first and second flow paths, wherein directing the third fluid includes directing the third fluid to the heat exchanger, wherein the third fluid includes air for cooling the first and second fluids, and wherein directing the third fluid along the third flow path includes directing the third fluid from an entrance of the heat exchanger to an exit of the heat exchanger, with the first flow path passing between the entrance and the second flow path, and the second flow path passing between the entrance and the first flow path;
transferring heat between the third fluid and the second fluid at a first transfer rate when the first fluid carries heat at a first rate; and
transferring heat between the third fluid and the second fluid at a second transfer rate different than the first transfer rate when the first fluid does not carry heat or carries heat at a second rate less than the first rate.

13. The method of claim 12, further comprising:
transferring heat between the first fluid and the third fluid at approximately the first transfer rate when the first fluid carries heat at the first rate; and
when the first fluid does not carry heat or carries heat at the second rate, not transferring heat between the first fluid and the third fluid, or transferring heat between the first fluid and the third fluid at a fourth rate less than the first rate.

14. The method of claim 12 wherein transferring heat at a second transfer rate includes transferring heat at a second transfer rate while the geometric arrangements of the first, second and third flow paths, respectively, are at least generally the same as when transferring heat at the first transfer rate.

15. The method of claim 12 wherein:
the first flow path includes a first entrance and a first exit;
the second flow path includes a second entrance and a second exit;
the third flow path includes a third entrance and a third exit;
passing the first fluid includes passing the first fluid along a first flow path that extends away from the third fluid entrance; and
passing the second fluid includes passing the second fluid along a second flow path that extends toward the third fluid entrance.

16. The method of claim 12 wherein:
the first flow path includes a first entrance and a first exit;
the second flow path includes a second entrance and a second exit;
the third flow path includes a third entrance and a third exit, with the first fluid entrance located between the third fluid entrance and the second fluid exit;
passing the first fluid includes passing the first fluid along a first flow path that extends away from the third fluid entrance; and
passing the second fluid includes passing the second fluid along a second flow path that extends away from the third fluid entrance.

17. The method of claim 12 wherein:
the first flow path includes a first entrance and a first exit;
the second flow path includes a second entrance and a second exit;
the third flow path includes a third entrance and a third exit; and
passing the third fluid includes passing the third fluid along first and second generally parallel segments of the third flow path positioned between the third entrance and the third exit, with the third fluid in the first segment passing sequentially adjacent to the first flow path and the second flow path, and with fluid in the second segment passing sequentially adjacent the second flow path and the first flow path.

18. The method of claim 12 wherein the first, second and third flow paths are located in a single heat exchanger, and wherein the method further comprises directing a fourth fluid along a fourth flow path in the heat exchanger, and transferring heat between the third fluid and the fourth fluid.

* * * * *